United States Patent [19]

Cuttica

[11] Patent Number: 4,599,254

[45] Date of Patent: Jul. 8, 1986

[54] ARTICLE OF FURNITURE HAVING CHANGEABLE DECORATIVE SURFACE

[75] Inventor: Angelo Cuttica, Quargnento, Italy

[73] Assignee: J & G Importing Inc., Hauppauge, N.Y.

[21] Appl. No.: 638,929

[22] Filed: Aug. 9, 1984

[51] Int. Cl.[4] .................................................. B32B 3/14

[52] U.S. Cl. .......................................... 428/45; 52/384; 52/387; 52/390; 52/392; 273/153 S; 428/48; 428/49; 428/51; 428/195; 428/900; 428/912.2

[58] Field of Search ..................... 428/45, 48, 49, 192, 428/51, 195, 900, 912.2; 52/384, 387, 390, 392; 273/153 S

[56] References Cited

U.S. PATENT DOCUMENTS

| | | | |
|---|---|---|---|
| 1,101,567 | 6/1914 | Ridgway | 273/153 S |
| 1,174,506 | 3/1916 | Kesner | 273/153 S |
| 1,767,081 | 6/1930 | Körber | 428/49 |
| 3,740,913 | 6/1973 | Musser | 52/387 |

FOREIGN PATENT DOCUMENTS

| | | | |
|---|---|---|---|
| 0082032 | 6/1983 | European Pat. Off. | 428/45 |
| 822058 | 7/1949 | Fed. Rep. of Germany | 428/45 |

*Primary Examiner*—George F. Lesmes
*Assistant Examiner*—P. R. Schwartz
*Attorney, Agent, or Firm*—Alan H. Levine

[57] ABSTRACT

A decorative surface arrangement for an article of furniture includes a plurality of tiles, at least some of which carry decorative matter on their exposed surfaces. The edges of each tile have retaining means cooperable with retaining means on the edges of other tiles to maintain the tiles in engagement with one another while permitting relative sliding movement between the tiles in the plane of the decorative surface. The tiles move within a frame fixed to the furniture and engage retaining means carried by the frame. There is space available within the frame for accommodating one tile more than the number of tiles within the frame. The retaining means may include tongue means projecting laterally from part of the circumference of each tile and groove means in the remaining part of the tile circumference.

10 Claims, 9 Drawing Figures

FIG. 1
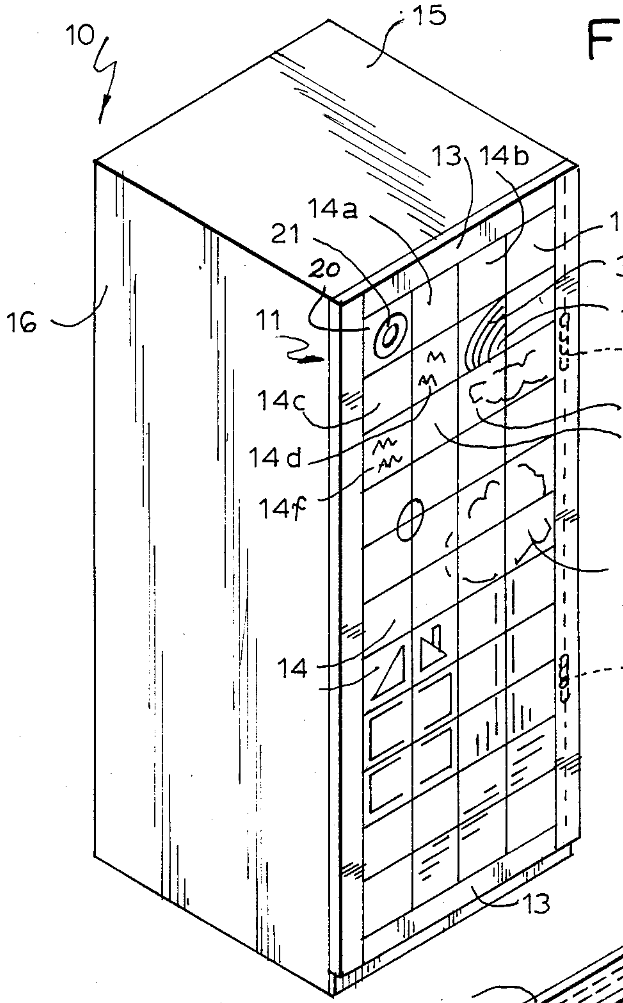
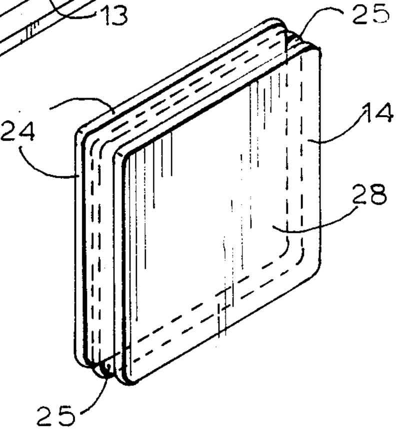
FIG. 3
FIG. 2
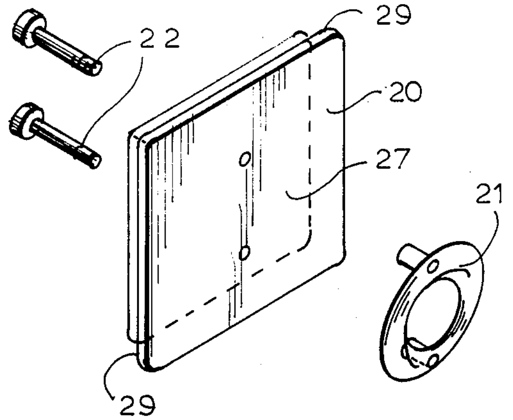

FIG. 4
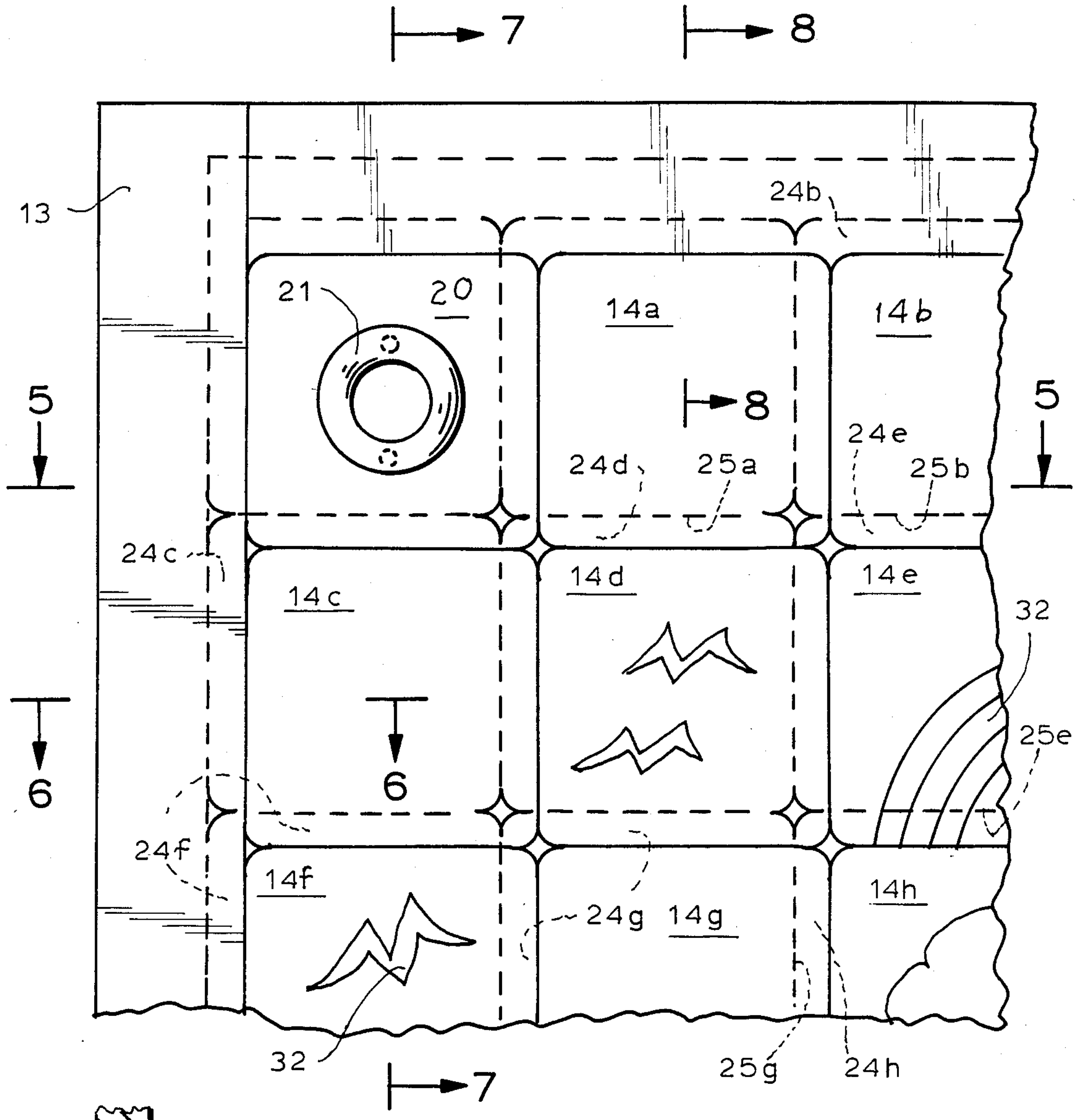
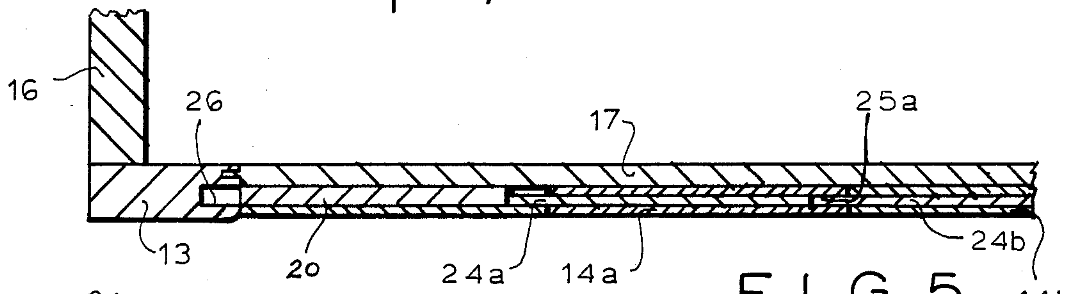
FIG. 5
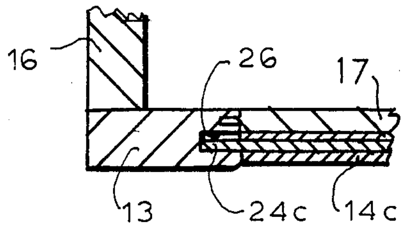
FIG. 6

FIG. 7
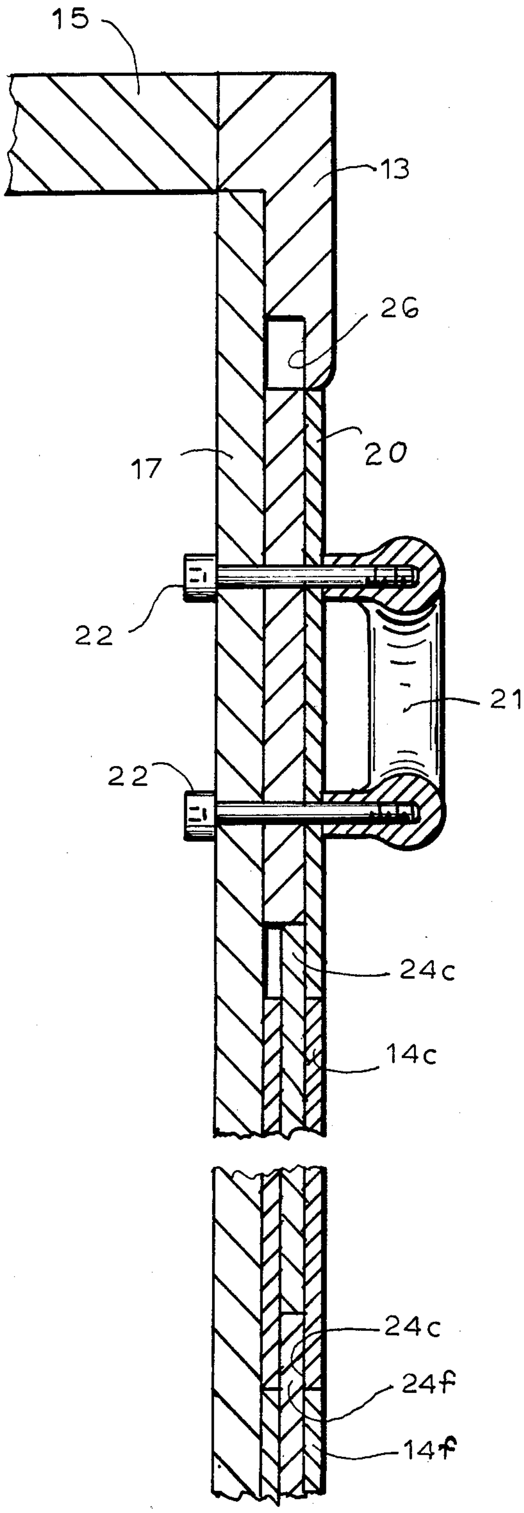
FIG. 8
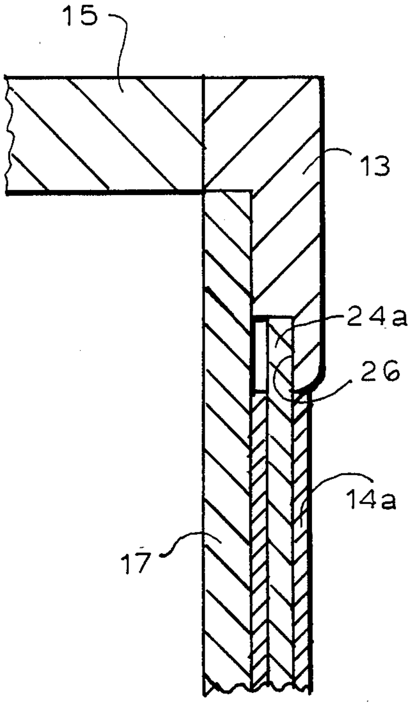
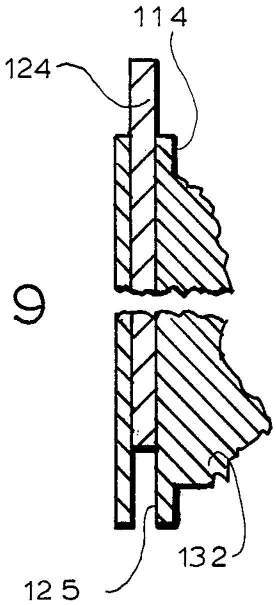
FIG. 9

ARTICLE OF FURNITURE HAVING CHANGEABLE DECORATIVE SURFACE

This invention relates to furniture, and more particularly to articles of furniture provided with decorated surfaces, e.g., inlays, moldings, and painted images.

At the present time, such surface decorations are permanent, or stationary, and cannot be readily altered or rearranged at the will or whim of the owner of the furniture.

It is a general object of the present invention to provide an article of furniture having a decorated surface which is variable so that its appearance can be changed at will, and as often as desired, to give the furniture a new look.

It is another object of the invention to provide such an article of furniture having a mosaic-like surface arrangement comprising a multiplicity of individual tiles interengaged with each other by retaining means along their edges, the tiles nevertheless being slidable with respect to each other. The tiles are arranged within a frame, and there is space available within the frame for accommodating one tile more than the number of tiles within the frame. Consequently, the relative positions of the tiles within the frame can be shifted to establish many different combinations of tile locations. As a result, if most or all of the tiles have decorated surfaces, numerous different decorative pattern variations can be achieved on the surface of the furniture.

The decorations on the tile surface may be such that they can cooperate to produce pictorial effects, or they may form abstract patterns or designs, or they may be three-dimensional so as to yield changeable sculptured or relief designs. Other decorative elements may be used, such as tiles which carry mirrors or metallic members. Additionally, the furniture surface beneath the tiles may carry a decoration which is partially visible at a place or places where no tiles cover it.

The cooperable retaining means carried by the tile edges are preferably tongue-in-groove arrangements. However, other suitable means can be used, such as magnets. Furthermore, the tiles may be made of any suitable material, such as, wood, plastic, glass, paper, or metal, and may have a variety of geometrical configurations.

Additional objects and features of the invention will be apparent from the following description in which reference is made to the accompanying drawings. In the drawings:

FIG. 1 is a perspective view of an article of furniture, in this case a cabinet, having a surface, in this case the cabinet door surface, decorated according to the present invention;

FIG. 2 is an exploded perspective view of a filler tile and door handle;

FIG. 3 is a perspective view of a typical movable tile forming part of the decorative surface;

FIG. 4 is fragmentary elevational view, on an enlarged scale, of a portion of the decorative surface shown in FIG. 1;

FIGS. 5, 6, 7, and 8 are cross-sectional views taken along lines 5—5, 6—6, 7—7, and 8—8, respectively, of FIG. 4; and FIG. 9 is a cross-sectional view through a tile, similar to the tile of FIG. 3, but bearing a three-dimensional decorative effect on its outer surface.

The article of furniture chosen to illustrate the present invention, and shown in FIG. 1, is a cabinet 10 having a top wall 15, a side wall 16, and a front door 11 which can be swung on hinges 12 to open and close the cabinet. Door 11 includes a panel 17 (FIGS. 5–8), such as of plywood, around the periphery of which is a frame 13. Within frame 13 are a plurality of decorative tiles 14, certain of the tiles which are also shown in figures other than FIG. 1, being identified by the reference numeral 14 followed by a letter, e.g., **14*a*, 14*b*, etc. Although in this example frame 13 extends along the entire periphery of door 11**, the frame could occupy less of the front door area, so that only part of the door surface bears the decorative tile arrangement.

A filler tile 20, different from tiles 14 in a way to be described below, is shown in the upper left-hand corner of frame 13. A handle 21, for opening door 11, is mounted on the outer face of filler tile 20 by bolts 22 (FIGS. 2 and 7) which pass through holes in panel 17 and tile 20. Filler tile 20 could be eliminated, so as to provide a permanent space within frame 13 for accommodating one tile more than are actually located within the frame, in which case a handle could be fixed to frame 13.

In the present example, each tile 14 is square, and presents a tongue 24 (FIG. 3) projecting laterally from two adjacent edges of the tile, e.g., the top and left side as viewed in FIG. 3. Along the other two adjacent edges, e.g., the bottom and right side, each tile is formed with a groove 25. In FIGS. 4–8, the tongues and grooves of each tile bear the reference numerals 24 and 25, respectively, followed by the same letter used after the reference numeral 14 to identify that tile. The tongue 24 of any tile is slidable within the groove 25 of any other tile to which it happens to be adjacent. Thus, the tongues 24 and grooves 25 cooperate as retaining means to keep the tiles from falling away from panel 17 while permitting sliding movement of the tiles, with respect to each other, within the plane containing the decorative tiles. The top and left side of frame 13, as viewed in FIG. 1, are undercut to form grooves 26 (FIGS. 4–8), for accommodating the tongues 24 of the tiles, and the bottom and right side of the frame are formed with tongues (not shown) fitting slidably within the grooves 25 of tiles 14. This cooperation serves to maintain all the tiles within the frame while permitting sliding movement of the tiles with respect to the frame.

Filler tile 20 has a front face 27 equal in size and contour to the front face 28 of each tile 14. However, tile 20 has no tongue comparable to tongue 24 of tile 14. Tile 20 is, however, undercut at 29 along its two edges corresponding to the two edges of tile 14 in which groove 25 is located. Thus, filler tile 20 does not cooperate with the tongues and grooves of adjacent tiles, or frame 13, to retain it in place, and hence it can be removed, simply by extracting bolts 22, to provide one empty tile-sized space. Once such a space is provided, tiles 14 can be shifted one-by-one along a horizontal and vertical grid-like pattern to change the positions of some or all of the tiles. After sufficient tiles have been moved to satisfy the user, filler tile 20 can be replaced in the upper left hand corner of the frame, from which it was removed, assuming that space is left open by the user. If not, tile 20 can be placed wherever an empty space is left, and bolt-accommodating holes can be furnished throughout panel 17 for this purpose.

In the illustrated example, the tile retaining means has been illustrated as a tongue-in-groove arrangement.

However, other expedients are possible. For example, each tile could be furnished with a permanent magnet accommodated within a small groove in each of its four edges, and the inner edges of the frame could similarly be provided with magnetic means along their lengths. Such magnets would keep the tiles from falling away from panel 17 and yet permit relative sliding movement between the tiles.

All or most of the tiles carry decorative material 32 on their front faces which cooperate to depict realistic or abstract subject matter. It is the total effect of all the decorative material which can readily be changed by moving the tiles, to give the article of furniture a completely different decorative appearance.

In FIGS. 1–8 the decorative subject matter on each tile is shown as being two-dimensional. However, as illustrated in FIG. 9, one or more tiles 114 can be employed bearing three-dimensional decorative subject matter 132 on its front face. Tile 114 has a tongue 124 and a groove 125 cooperable to the tongues and grooves 24 and 25 described above.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. An article of furniture having an exposed changeable decorative surface arrangement, the arrangement comprising:

a plurality of tiles, at least some of which carry decorative matter on their exposed surfaces, retaining means carried by the edges of each tile, the retaining means of each tile being cooperable with the retaining means of other tiles to maintain the tiles in engagement with one another while permitting relative sliding movement between the tiles in the plane of the decorative surface, a frame fixed to the furniture, all the tiles being located within the frame, retaining means carried by the frame and cooperable with the retaining means carried by the edges of the tiles for maintaining at least some of the tiles, at any one time, in engagement with the frame while permitting sliding movement of those tiles with respect to the frame, the frame and tiles being so relatively sized that there is space available within the frame for accommodating at least one tile more than the number of tiles within the frame, whereby the tiles can be shifted with respect to each other, without leaving the confines of the frame, so as to change the decorative appearance of the surface arrangement, a filler tile devoid of the retaining means for occupying said available space, and means for securing the filler tile to the article of furniture so that the filler tile can be readily moved out of the plane of the decorative surface to establish said available space.

2. An article of furniture as defined in claim 1 wherein the frame is rectangular.

3. An article of furniture as defined in claim 1 wherein the exposed surface of each tile is rectangular.

4. An article of furniture as defined in claim 1 wherein the retaining means includes tongue means projecting laterally from no more than one half the circumferential length of each tile, and groove means formed within the remaining circumferential length of the tile, the groove means of each tile being adapted to accommodate the tongue means of any other tile.

5. An article of furniture as defined in claim 4 wherein each tile is generally rectangular in shape, and the tongue means projects from two adjacent sides of the tile and the groove means is located in the two opposite sides of the tile.

6. An article of furniture as defined in claim 1 wherein the retaining means includes magnetic elements carried by the edges of each tile.

7. An article of furniture as defined in claim 1 wherein the decorative matter on at least some of the tiles is two-dimensional pictorial matter.

8. An article of furniture as defined in claim 1 wherein when the tiles are arranged in a single predetermined pattern, a representational picture is created.

9. An article of furniture as defined in claim 1 wherein the decorative matter on at least one of the tiles is a mirror.

10. An article of furniture as defined in claim 1 wherein the decorative matter on at least some of the tiles is three-dimensional.

* * * * *